United States Patent [19]
Brandt

[11] Patent Number: 5,711,550
[45] Date of Patent: Jan. 27, 1998

[54] CONNECTING DEVICE FOR PIPELINES

[75] Inventor: Josef Brandt, Wipperfürth, Germany

[73] Assignee: Armaturenfabrik Hermann Voss GmbH & Co., Wipperfurth, Germany

[21] Appl. No.: 620,082

[22] Filed: Mar. 21, 1996

[30] Foreign Application Priority Data

Mar. 21, 1995 [DE] Germany ............... 195 10 193.6

[51] Int. Cl.⁶ .................................................. F16L 17/02
[52] U.S. Cl. ........................... 285/101; 285/110; 285/307; 285/319; 285/323
[58] Field of Search ....................... 285/322, 323, 285/319, 101, 100, 102, 375, 307, 110, 81

[56] References Cited

U.S. PATENT DOCUMENTS

| 3,711,125 | 1/1973 | Dehar | 285/319 X |
|---|---|---|---|
| 4,350,373 | 9/1982 | Fleischer | 285/320 X |
| 4,685,706 | 8/1987 | Kowal | 285/322 |
| 4,778,203 | 10/1988 | Bartholomew | 285/319 X |
| 5,067,754 | 11/1991 | Bartholomew | 285/319 X |
| 5,161,834 | 11/1992 | Norkey | 285/319 |
| 5,314,216 | 5/1994 | Umezawa | 285/319 |
| 5,324,081 | 6/1994 | Umezawa | 285/319 X |

FOREIGN PATENT DOCUMENTS

| 2611233 | 9/1977 | Germany | 285/319 |
|---|---|---|---|
| 3710853 | 10/1988 | Germany | 285/319 |

*Primary Examiner*—Dave W. Arola
*Attorney, Agent, or Firm*—Jones & Askew, LLP

[57] ABSTRACT

The invention pertains to a connection device (1) for the rapid and releasable connection of at least one synthetic pipeline (6), consisting of a housing portion (2) with at least one opening (4) for inserting the pipeline (6), as well as a clamp collar (8), arranged in the opening (4), which interacts with an inner cone (14) of the housing portion (2) via an outer cone (12) for the purpose of securing the pipeline (6). For the purpose of releasing the pipeline (6), the housing portion (2) is in two parts, consisting of a base portion (20) and an insertion portion (22), which is releasably connected with the same. The insertion portion (22) is connected with the base portion (20) via a positive snap connection (24).

5 Claims, 3 Drawing Sheets

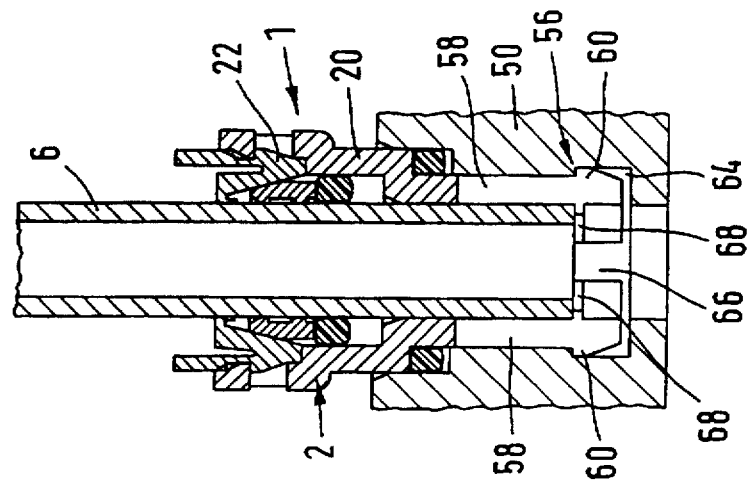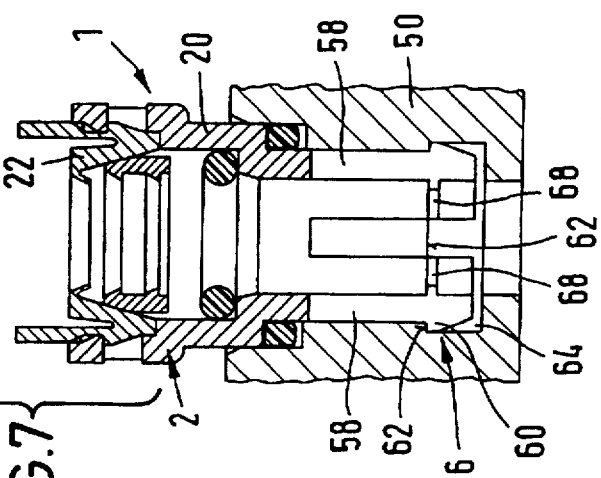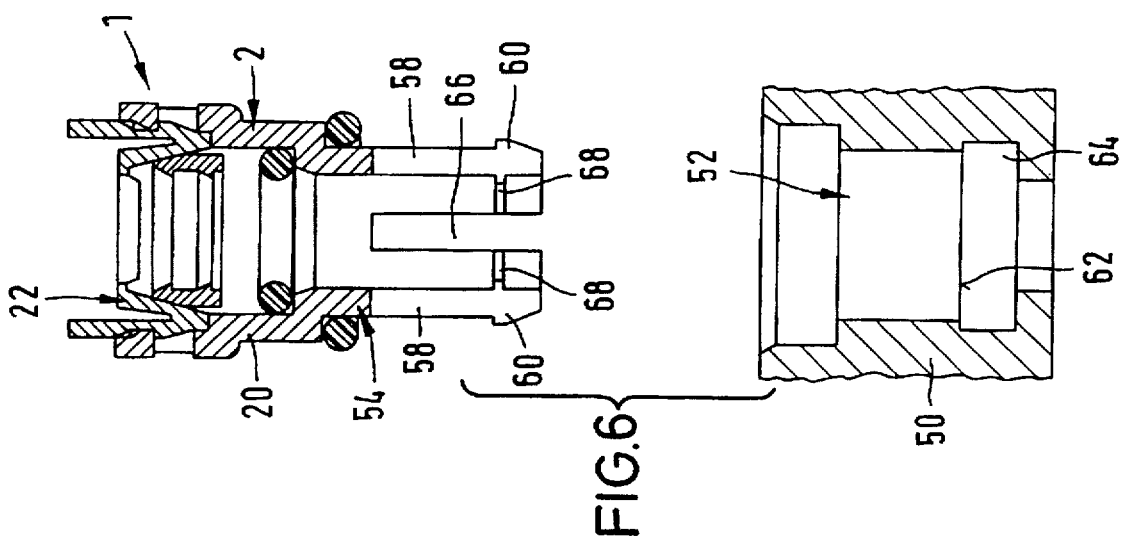

CONNECTING DEVICE FOR PIPELINES

The present invention pertains to a connection device for the rapid and releasable connection of synthetic pipelines, which consists of a housing portion with at least one opening into which the pipeline is inserted, as well as a slotted clamping ring, arranged in the opening and moldable in a radially elastic manner which, for the purpose of securing the pipeline, interacts via an outer cone with an inner cone of the housing portion, wherein the housing portion, for the purpose of releasing the pipeline, consists of two parts, namely, a base portion and an insertion portion, connected with the latter in a releasable manner, wherein the insertion portion has an unslotted annular portion which has the inner cone.

Such a connection device is known, for example, from DE-U 9,307,361. This connection device has essentially proven itself since, on the one hand, it permits a relatively simple and rapid connection of the pipeline through simple axial insertion; therefore, additional mounting steps are no longer required. On the other hand, due to a special design in the area of the clamping ring, this known device assures a particularly good securing of the pipeline while the clamping ring is simultaneously simple and cost-efficient to manufacture. However, it has been shown that handling during the mounting of the individual parts as well as during release of the pipeline is not yet optimal since the insertion portion is in the form of a screw-in piece, the external thread of which is screwed into the internal thread of the base portion. For this reason, the manufacture of the individual parts is also relatively costly. In addition, the creation of a seal toward the outside is also rather complicated, since a first pressure seal between the base portion and the insertion portion and a second pressure seal are provided inside the insertion portion and come to rest against the pipeline. Additionally, an additional seal, particularly against dust and moisture, is provided in the form of a sealing ring located inside the insertion portion.

DE-A/C 3,011,430 also describes an essentially generic device, wherein however in one arrangement, the housing portion consists of a base portion and a union nut which can be screwed onto an externally threaded section of the base portion. Furthermore, the above arrangements are applicable in an analogous manner.

DE 4,019,408 A1 describes a plug-in coupling which is not generic in that it is not directly suited for insertion of the pipeline end, but involves the provision of a special plug which has an annular step section along its outer perimeter which is formed in one piece. For this reason, after the plug has been inserted, a longitudinally slotted safety casing must be mounted as an additional mounting step, wherein the same is pushed over the plug and is locked with the housing. The annular step section of the plug has an outer cone, which interacts with an inner cone of the safety casing in such a way that when pressure is supplied to the system, the safety casing which can be elastically deformed in the radial direction, is spread across the cone surfaces by a radial force which is directed outward. In this case, a bracing of the safety casing is to be obtained which increases in accordance with the pressure.

Based on the described state of the art, it is the task of the present invention to create a connection device which is generic and which distinguishes itself in that its individual parts can be manufactured and mounted in a particularly simple and cost-efficient manner and in that it can be handled in an improved manner, particularly during the release of the pipeline.

In accordance with the invention, this is achieved in that the insertion portion is connected with the base portion via a snap interlocking connection. Thus, a lock or clip connection is involved, wherein advantageously the base portion and the insertion portion merely need to be inserted into each other until the locking means establishes a positive connection. The release of the pipeline is also very simple, wherein the locking connection is constructed in a releasable manner. Advantageously, for this purpose, the insertion portion has spring-loaded locking arms, wherein each locking arm with the locking cam radially grips in the outward direction into the lock opening of the base portion and wherein each locking arm advantageously has an operating section, which is essentially axial, i.e., approximately parallel to the insertion axis and protrudes from the base section. In this way, each locking arm can be operated manually from the outside via the operating section or it can possibly be operated with the aid of an appropriate tool for effecting its release.

At least the insertion portion, preferably also the base section, may be manufactured advantageously in a cost-efficient manner as a single-piece synthetic preform. For this purpose, it is advantageous that the insertion portion be formed in a simple manner with a flexible or elastic sealing lip extending along its perimeter for the purpose of creating a tight sealing contact with the outer peripheral surface of the pipeline, wherein the sealing lip assures a tight seal against dust, dirt and moisture (water spray). For the actual pressure seal, a sealing ring is preferably arranged within the base portion between the latter and the pipeline. Advantageously, this results in an additional seal between the base portion and the insertion portion. It is particularly advantageous when the pressure sealing ring, on the side of the clamping ring which is turned away from the insertion portion, is arranged between the same and an annular step of the base section in such a way that the inserted pipeline—during a movement in the direction of release—also engages with the clamping ring due to the nonpositive engagement of the sealing ring and thus—for the purpose of increasing the radial clamping force—moves against the inner cone. Thus, the sealing ring advantageously supports the securing function of the clamping ring against involuntary release of the pipeline, for example, a pressure-related release.

In this regard, it is advantageous to construct the insertion portion of the invention in the area of the positive connection in such a way that the axial holding force of the locked connection—during an increase in the opposite release force effected by mechanical stress on the line and/or through the application of an inner system pressure on the connection device, also increases. This may be achieved, most of all, by means of an active locking zone reentrant angle which is greater than 90°.

In one advantageous embodiment of the invention, the housing can be connected in a nonreleasable or releasable manner with practically any aggregate portion, for which purpose the housing portion has an insertion portion which can be inserted into an insertion opening of the aggregate portion in a sealing manner, and this insertion portion is held in the insertion opening by means of a positive snap connection. Preferably, for this purpose, the positive snap connection can be prevented from being released by means of the inserted pipeline. A preferred structural arrangement for this purpose will be described in the following text. Hence, the housing portion functions as a type of "adapter" for the connection of a pipeline to any desired aggregate parts which may include, for example, valve chambers or other components, such as a vehicle brake system (particularly compressed-air brake). Here, the connection between the housing portion and the aggregate portion is also simple and cost-efficient and nonetheless very functional.

Additional advantageous characteristics of the embodiment of the invention are contained in the subclaims as well as in the following description.

With reference to the figures, the invention will be explained further in the form of an example, wherein FIG. 1 shows an axial cross section with respect to the insertion axis through a connection device of the invention with an additional representation of a pipeline prior to insertion;

FIG. 6 shows an axial section of the connection device analogous to FIG. 1, however in an advantageous further embodiment with an additional representation of an aggregate portion prior to connection;

FIG. 7 shows a view analogous to FIG. 6 in the condition wherein the connection device is connected with the aggregate portion, however, prior to insertion of a pipeline; and FIG. 8 shows a view analogous to FIG. 7, wherein the pipeline is inserted and secured.

In the different figures, identical parts are always provided with the same reference numerals.

Figure 1:
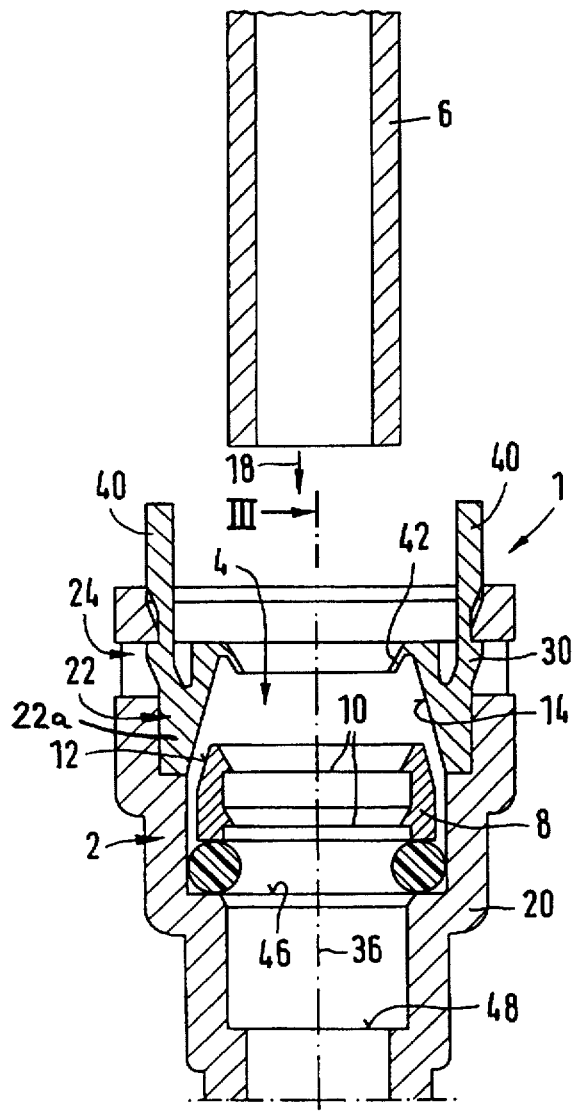
Figure 2:
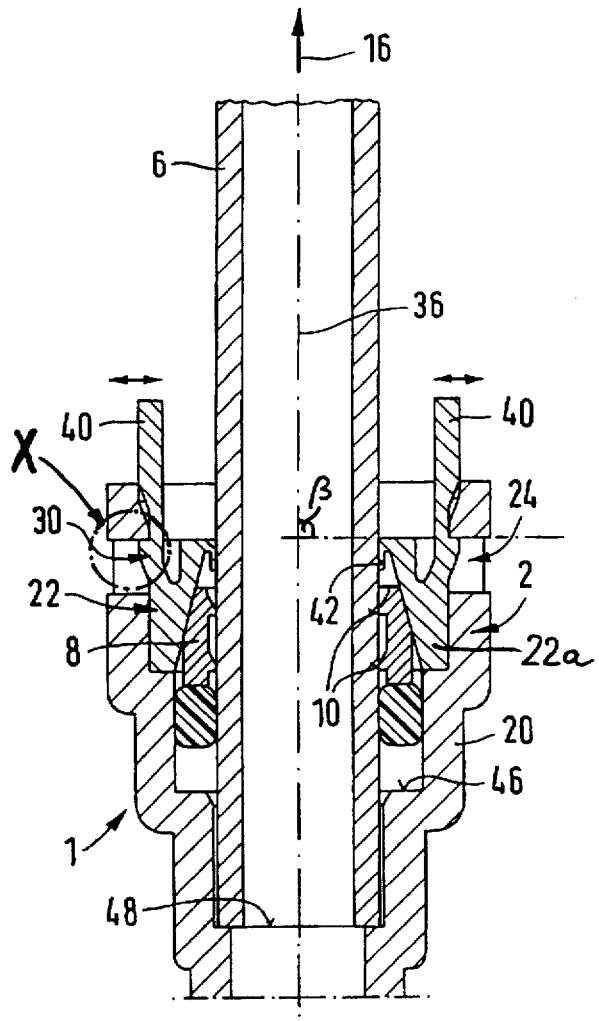
FIG. 2 shows a view analogous to FIG. 1 with the pipeline inserted and secured.

As FIGS. 1 and 2 show, a connection device (1) in accordance with the invention consists of housing portion (2) with an opening (4) open on one side for the axial insertion of one end of a pipeline (6), as well as of a clamping ring (8), arranged in the housing portion (2) or in the opening (4) for securing the axially inserted pipeline (6). For this purpose, the connection device (1) permits a mounting of the pipeline (6) by simple insertion into the housing (2) without additional mounting steps, since the connection device (1) with the housing portion (2) and the clamping ring (8) have already been mounted. The clamping ring (8) is located in a widened area of the opening (4) so that it surrounds the latter and thus also the inserted pipeline (6). The clamping ring (8) has, at one point on its perimeter an axially and radially penetrating longitudinal or radial slot, i.e., an interruption in its peripheral course, whereby it can be widened and narrowed in a radially elastic manner. In its inner peripheral area, the clamping ring (8) has at least one radially-inward extending, circumferential cutting edge (10). However, in the example shown, two axially spaced cutting edges (10) are provided. Furthermore, the clamping ring (8) has an outer cone (12) which, for the purpose of securing the pipeline, interacts with an inner cone (14) of the housing portion (2) in such a way that, during pulling in the direction of release (direction of arrow (16) in FIG. 2) on the pipeline (6), i.e., during movement opposite the direction of insertion (arrow (18) in FIG. 1), the clamping ring (8) is engaged due to the positive positioning of its cutting edge (10) until its outer cone (12) comes to rest against the inner cone (14) of the housing portion (2). Upon continuing pulling, a radially-inward directed force is produced via the cones (12,14), by means of which the clamping ring (8) is elastically narrowed in a known manner, so that the cutting edges (10) interact in a nonpositive or positive manner with the essentially smooth surface, cylindrical outer perimeter of the pipe and thus the pipe is prevented from being pulled out.

In order to make it possible for the pipeline (6) to be subsequently released, the housing portion (2) consists of two parts which are releasably connected with each other, i.e., of a base portion (20) and an insertion portion (22). For this purpose, the insertion portion (22) has, in the area of an annular portion (22a) which is closed in the direction of the perimeter, i.e., an unslotted annular portion, the inner cone (14), so that upon release of the insertion portion (22) from the base portion (20), the pipeline (6) can be removed together with the clamping ring (8) and the insertion portion (22). Due to its unslotted peripheral contour, the annular portion (22a) is sufficiently "form stable" in order to be able to absorb the radial forces occurring across the cone surface during narrowing of the clamping ring (8).

Figure 4:
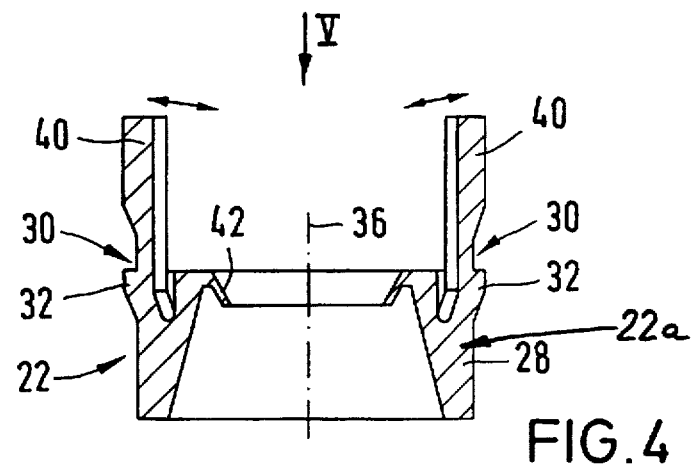
FIG. 4 shows a sectional view in the sectional plane as in FIG. 1 of an insertion portion of the connection device of the invention which can be connected with the base portion in accordance with FIG. 3.
Figure 5:
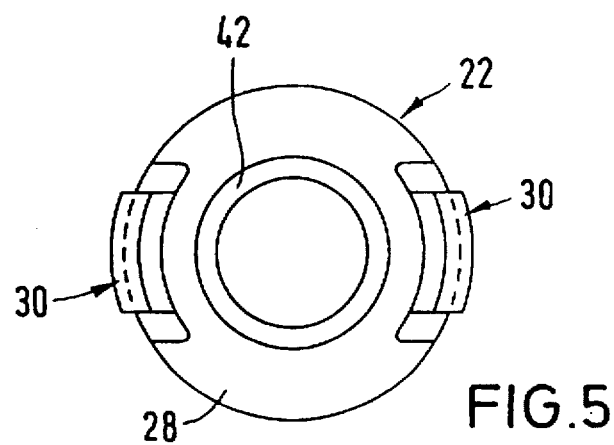
FIG. 5 shows a plan view of the insertion portion in the direction of arrow V in accordance with FIG. 4.

In accordance with the invention, the insertion portion (22) is releasably connected via a positive snap connection (24) with the base portion (20), i.e., locked or latched. For this purpose, the insertion portion (22) consists preferably of an centering ring (28), forming the unslotted annular portion (22a) and insertable at least in some areas into a widened portion (26) of the opening (4) (see FIG. 3) of the base portion (20) and having the inner cone (14) and at least two spring-loaded locking arms (30) (see FIGS. 4 and 5) in particular, distributed evenly around the periphery. Here, each locking arm (30) grips with a locking cam (32) outwardly in the radial direction into a locking opening (34) of the base portion (20), i.e., in order to achieve a "true" positive connection with an active zone reentrant angle of $\beta \geq 90°$ (see FIGS. 2 and 2a). Here, the locking arms (30) extend essentially axially, i.e., approximately parallel to the insertion axis (36). In the example shown, two locking arms (30) are provided which are arranged diametrically opposite each other due to the even, radially symmetrical distribution around the perimeter. The unslotted eccentric ring (28) is preferably supported on an annular step (38) (see FIG. 3) within the base portion (20). The insertion portion (22) is preferably produced as a one-piece preform made of a synthetic material. Preferably, the equivalent is applicable also to the base portion (20).

As can be seen from FIGS. 1 and 2, each locking arm (30) advantageously has an operating portion (40) which extends essentially axially, i.e., parallel to the insertion axis (36) from the base portion (20). Hence, the operating sections (40) are accessible from the outside for the manual operation of the locking arms (30). For this purpose, the operating sections (40) are moved in succession radially toward the inside or in the direction of the pipeline (6) until the locking cams (32) leave the locking openings (34) and thus compensating for the positive connection. The pipeline (6), together with the insertion portion (22) and the clamping ring (8) can then be removed.

Figure 2A:
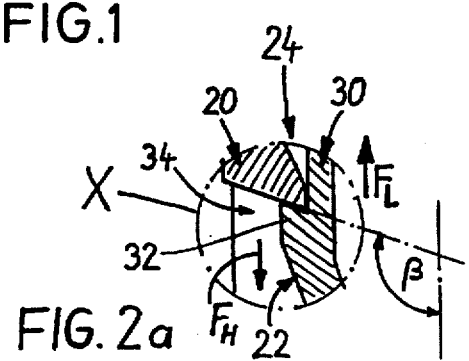
FIG. 2a shows an enlarged detailed representation of area X in FIG. 2 in an advantageous embodiment of the locking connection of the invention.

According to FIG. 2a, it is particularly advantageous when the locking connection (24) is formed with a reentrant angle of $\beta \leq 90°$. In this way, it is achieved that during the occurrence or during the increase of a force ($F_L$), effective in the direction of release (arrow (16) in FIG. 2), the holding force ($F_H$) also increases accordingly. This results in a high degree of safety against accidental release of the pipeline (6).

In a particularly advantageous arrangement of the invention, the insertion portion (22) has an internally circumferential sealing lip (42) for the sealing contact with the outer peripheral surface of the pipeline (6). Prior to insertion of the pipeline (6), this flexible, elastic sealing lip (42) extends diagonally in the inward direction in accordance with FIG. 1 in the direction of insertion and is then somewhat widened in the outward direction due to the inserted pipeline (6) according to FIG. 2, so that it comes to rest in a sealing manner. The sealing lip (42) serves for sealing particularly against dust, dirt and moisture (water spray). For this purpose, the sealing lip (42) is also molded in one piece as a thin, lamellar annular flange.

As can also be seen from FIGS. 1 and 2, a sealing ring (44) for pressure-tight sealing purposes is provided preferably on the side of the clamping ring (8) which is turned away from the insertion portion (22) between the latter and an annular step (46) of the base portion (20) (see FIG. 3) in such a way that the inserted pipeline (6), during movement in the direction of release (16) (FIG. 2) across the sealing ring (44), engages the clamping ring (8) and thus, advantageously for the increase in the radially-outward directed clamping force, moves against the inner cone (14).

Figure 3:
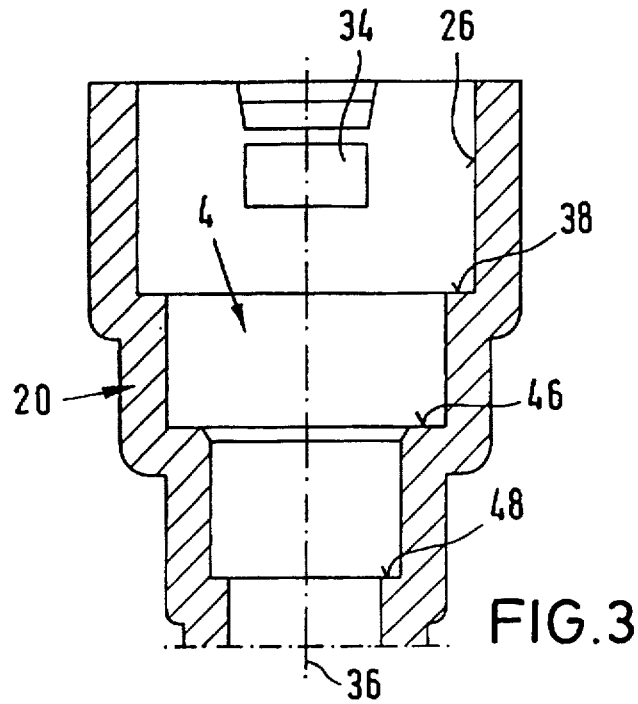
FIG. 3 shows a sectional view along line III—III in accordance with FIG. 1 of a base section of the connection device of the invention (without interior parts)

With the example shown in FIGS. 1-3, within the base portion (20), a limit stop for limiting the insertion of the pipeline (6) is formed in the form of an annular step (48).

In FIGS. 6-8, an advantageous further embodiment of the invention is shown. In this case, the connection device (1) or the housing section (2) of the invention can be connected with any desired aggregate portion (50). For this purpose, the housing portion (2) has an insertion portion (54) that can be inserted in a sealing manner into an insertion opening (52) of the aggregate portion (50), wherein this insertion portion (54) is held in the insertion opening (52) preferably via a positive snap connection (56). It is particularly advantageous when the positive snap connection (56) can be prevented from becoming released by means of the inserted pipeline (6).

In the example shown, this is achieved in that the insertion portion (54) has at least one locking arm. However, preferably at least two—as shown four—locking arms (58) are provided which are arranged particularly evenly across the perimeter (radially-symmetric) and extending essentially axially, parallel to the insertion axis (36), which locking arms are spring-loaded in the radial direction. Each locking arm (58) grips behind an annular step surface (62) of the aggregate portion (50) in a positive manner with at least one locking cam (60). In this case, it is possible to also provide an arrangement analogous to FIG. 2a. Preferably, the pipeline (6) can be inserted through the opening (4) into the locking arm area in such a way that, due to the position of the locking arms (58) on the pipeline (6), a radially disengaging movement of the locking arms (58) is not possible. This condition is shown in FIG. 8. The annular step surface (62), interacting with the locking cam (60) for the purpose of producing a positive connection, is preferably formed by an annular-groove-like expansion (64) of the insertion opening (52). The preferably four locking arms (58) of the insertion portion (54) are respectively formed by axial slots (66) or are separated from each other.

Thus, with this embodiment according to FIGS. 6-8, the above-described annular step (48) as an insertion limit stop is missing and the locking arms (58) have, in their free end area, radially-inward extending contact flanges (68) as an insertion limit stop for the pipeline. This function can be clearly seen in FIG. 8.

The invention is not limited to the examples shown and described but comprises all embodiments which, in the sense of the invention, have the same effect.

I claim:

1. Connection device (1) for the rapid and releasable connection of a synthetic pipeline (6), comprising in combination:

a housing portion (2) with at least one opening (4) for inserting the pipeline (6);

the housing portion (2) having a base portion (20) and an insertion portion (22) selectively separable from the base portion, the insertion portion defining a perimeter surrounding a pipeline inserted into the opening;

a clamping ring (8) within the opening (4) of the housing portion and having an outer cone (12) operatively associated with an inner cone (14) of the insertion portion (22) for securing the clamping ring to the pipeline;

the insertion portion (22) including means for selectively connecting the insertion portion to the base portion (2) via a positive snap connection (24), whereby the insertion portion is releasably connected with the base portion so as to selectively release the pipeline with the clamping ring secured thereto from the base portion; and the insertion portion (22) having an inner sealing lip (42) extending along the perimeter for a sealing fit on an outer peripheral surface of the pipeline (6) received in the opening.

2. Connection device (1) for the rapid and releasable connection of a synthetic pipeline (6), comprising in combination:

a housing portion (2) with at least one opening (4) for inserting the pipeline (6);

the housing portion (2) having a base portion (20) and an insertion portion (22) selectively separable from the base portion, the insertion portion defining a perimeter surrounding a pipeline inserted into the opening;

a clamping ring (8) within the opening (4) of the housing portion and having an outer cone (12) operatively associated with an inner cone (14) of the insertion portion (22) for securing the clamping ring to the pipeline;

the insertion portion (22) including means for selectively connecting the insertion portion to the base portion (2) via a positive snap connection (24), whereby the insertion portion is releasably connected with the base portion so as to selectively release the pipeline with the clamping ring secured thereto from the base portion;

the housing portion has a second insertion portion (54) operative for sealing insertion into an insertion opening (52) of an aggregate portion (50);

means for providing a positive snap connection (56) between the second insertion portion and the insertion opening (52) of the aggregate portion so as to hold the second insertion portion in the insertion opening (52); and means for associated with the second insertion portion and responsive to an inserted pipeline (6) for preventing release release of the positive snap connection.

3. Connection device, in accordance with claim 2, characterized in that the means providing a positive snap connection for the second insertion portion (54) includes at least two locking arms (58), which are spring-loaded in the radial direction and are evenly distributed across a perimeter of the insertion portion and which extend substantially axially parallel to the insertion axis (36), wherein each locking arm (58) grips behind an annular step surface (62) of the aggregate portion (50) with at least one locking cam (60) in a positive manner, wherein the means associated with the second insertion portion includes the pipeline (6) inserted through the opening (4) into the locking arm area in such a way that, due to the position of the locking arm(s) (58) on the pipeline (6), a radial release of the locking arm(s) (58) is not possible.

4. Connection device, in accordance with claim 3, characterized in that the second insertion portion (54) has four locking arms (58) between which, respectively, axial slots (66) have been formed.

5. Connection device, in accordance with claim 4, characterized in that the locking arms (58) having inner contact flanges (68) in their free end area, located in the path of the inserted pipeline and serving as an insertion limit stop for the pipeline (6).

* * * * *

UNITED STATES PATENT AND TRADEMARK OFFICE
CERTIFICATE OF CORRECTION

PATENT NO. : 5,711,550

DATED : January 27, 1998

INVENTOR(S) : Josef Brandt

It is certified that error appears in the above-identified patent and that said Letters Patent is hereby corrected as shown below:

Column 6, line 59, delete "release" (second occurrence).

Signed and Sealed this

Seventh Day of April, 1998

Attest:

BRUCE LEHMAN

*Attesting Officer*  *Commissioner of Patents and Trademarks*